Figure 1:
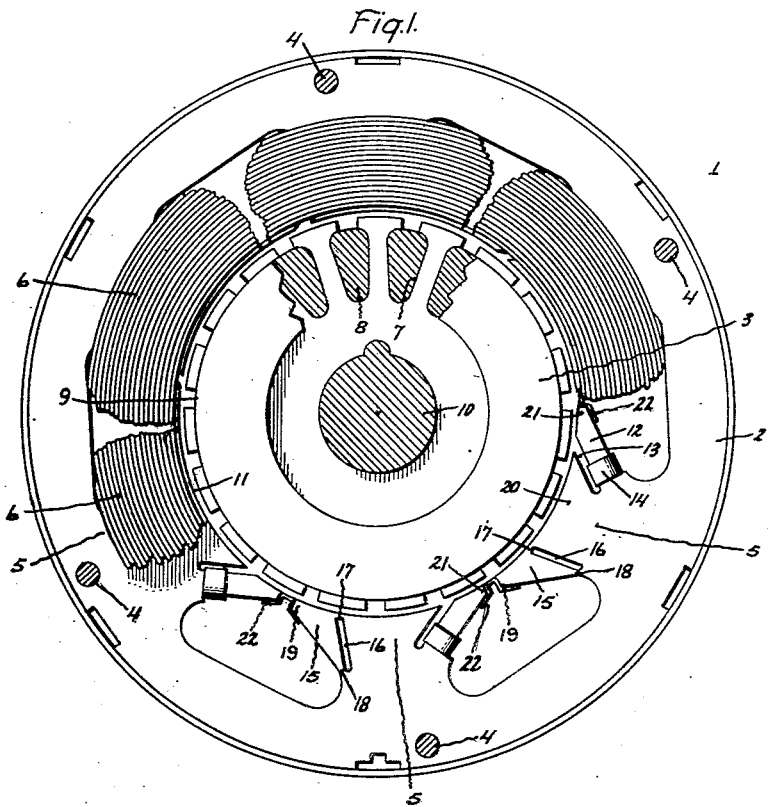

Dec. 3, 1957 R. D. JONES ET AL 2,815,460

SHADED POLE MOTOR

Filed Aug. 26, 1955

Inventors:
Ray D. Jones,
John L. Oldenkamp,
by *[signature]*
Their Attorney.

2,815,460
Patented Dec. 3, 1957

2,815,460
SHADED POLE MOTOR

Ray D. Jones, Syracuse, and John L. Oldenkamp, Fort Wayne, Ind., assignors to General Electric Company, a corporation of New York Application August 26, 1955, Serial No. 530,823

6 Claims. (Cl. 310—172)

This invention relates to alternating-current dynamo-electric machinery, and more particularly to shaded pole induction motors.

There are many applications, particularly in the small motor field, where shaded pole induction motors provide great overall economy. Such motors generally include a salient pole stator with at least part of each pole having a shading coil embracing a portion thereof to provide a flux which lags the flux in the main portion of the pole. This phenomenon tends to produce a rotating field and thereby provide a starting torque for the motor. At the same time, however, the area spanned by the shading coil will provide a lower flux than the remainder of the pole. This has the result that, in the range of a practical design, an increase in starting torque by increasing the shaded pole area must always involve a lower running efficiency. This condition necessitates a compromise between starting torque and runing efficiency in the design of such motors.

In addition to the difficulties required by the compromise between efficiency and starting torque, shaded pole motors also have had the disadvantage that a strong third harmonic field is created due to the distribution of flux in the radial air gap. This third harmonic field attains synchronous speed at one third the synchronous speed of the motor, and a little above that speed a negative torque will be developed by the action of the third harmonic field which considerably reduces the torque available for the load. It is, therefore, highly desirable to decrease to a great extent the dip in torque which has heretofore been caused by exceeding the synchronous speed of the third harmonic field. Where the motor load is such as a fan or blower (a common field of use for shaded pole induction motors), the load will increase as the speed increases due to the air resistance. In such a case, a strong third harmonic dip in torque may well cause the torque available at that point to be less than the load; in such a case, it is impossible for the motor to come up to speed since the motor will slow down until the torque again exceeds the fan load, and thus will never be able to increase in speed past the point of the third harmonic dip.

Another undesirable feature which has been most difficult to avoid in the past has been an unusual amount of noise when a load such as a fan was operated by a shaded pole motor. It is highly desirable to eliminate the excessive noise which has heretofore generally been present during the starting of shaded pole motors in connection with fan type loads.

It is most desirable that the features set forth above be obtained without any modification of the uniform radial air gap between the stator poles and the rotor. This arises from the fact that the manufacturing process is complicated to a considerable extent as soon as one introduces variations in the radial air gap.

There are many approaches to the types of problems discussed above; two such approaches, are for instance, the structures shown in Patent 2,591,117 Ballentine and in French Patent 1,064,568. It is, however, most desirable to achieve a structure which will provide an improved motor insofar as all the problems discussed are involved, that is, one which will provide a relatively high efficiency and a low starting noise compared to most previous structures while decreasing the undesirable third harmonic dip, the entire structure to have a uniform radial air gap so that it will be relatively simple to manufacture.

It is, therefore, an object of this invention to provide an improved shaded pole induction motor structure having the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broader aspects, provides an alternating-current induction motor of the shaded-pole type with a squirrel cage rotor and a stator surrounding the rotor and concentric therewith. The stator is symmetrical and is divided into a plurality of equispaced salient poles which form radial air gaps with the rotor. Each of the poles has a shading coil spanning a section at one end, and has another section at its other end which is connected to the remainder of the pole through a high reluctance area.

Figure 2:
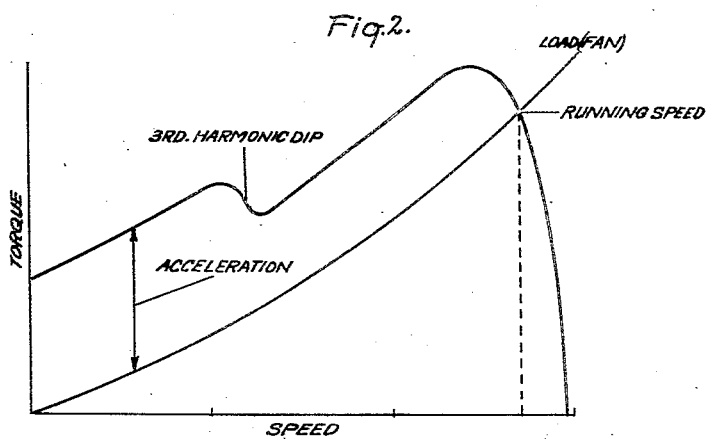

In the drawing, Figure 1 is an end view, partly cut away and partly in section, of a shaded-pole induction motor provided with the improved construction of this invention; and Figure 2 is a graph setting forth the torque-speed performance of the improved motor of this invention.

Referring now to Figure 1 of the drawing, there is illustrated an alternating-current shaded-pole induction motor, generally indicated at 1, having a stator 2 and a rotor 3, with the rotor being mounted concentrically and rotatably within the stator 1 by any desired means (not shown). Stator 2 is preferably formed of a plurality of thin laminations of magnetic material (only one lamination is seen in the figure) which may be secured together by any desired means, such as rivets 4, for example. Stator 2 is provided with six salient poles 5 which are each wound with a single phase running winding 6 in standard fashion. Rotor 3 is mounted on a shaft 10 and is formed of a plurality of stacked laminations of magnetic material having punched-out openings 7 each containing a bar 8 of conductive material. The bars 8 are connected together at each end by a ring 9 of conductive material so that closed conducting loops are provided around the surface of rotor 3.

The face 11 of each pole 5 of stator 2 is formed concentrically with rotor 3 so as to provide a uniform radial air gap. At one end of each pole there is a section 12 separated from the remainder of the pole by a slot 13 which accommodates a shading coil 14 which modifies the flux within section 12 so that it lags the flux in the remainder of the pole. Such shading coils are well known and are generally formed of a single closed turn of a highly conductive material such as copper. At the other end of each pole 5 there is provided a section 15 separated from the remainder of the pole by a slot 16 which extends from adjacent the bore of the pole to adjacent the back of the pole so as to provide a relatively high reluctance path to flux traveling into section 15. This effect is achieved by making slot 16 of such dimensions that the thin bridge areas 17 and 18 at each end respectively of the slot are so small as to saturate at a relatively low voltage compared to the normal operating voltage of the motor.

It will be recalled that it has been stated that the flux in section 12 is of necessity less than that in the remainder of the pole. In most previous constructions the high flux of the remainder of the pole has been continued over to the tip 19 of the pole. However, by the porvision of slot 16, the flux within section 15 of each pole will be less than that in the central portion 20 of the pole as soon as the voltage is high enough to cause saturation at bridges 17 and 18. This diminution within section 15 of flux which is available to pass through to rotor 3 tends to balance the decreased flux due to coil 14 at the other end 21 of the pole. When an unbalance in the flux of the type created by shading coil 14 is permitted to go uncorrected or substantially uncorrected, the negative torque effect of the third harmonic field becomes very noticeable and accounts for an undesirably large dip in torque as the motor comes up to speed.

Referring to Figure 2, it will be noted that, since the difference between the torque and the load on the motor at any given instant provides the acceleration for the motor, the elimination of the third harmonic dip to the extent shown will provide for a substantial amount of acceleration all the way up the running speed of the motor. It will, however, be seen that where, as has previously often been the case, the third harmonic dip is permitted to become substantial the torque might dip down quite close to the load curve, thereby precluding any substantial amount of acceleration at that point. If, in fact, the torque curve were to be permitted to touch or go below the load curve at that point, the motor would be unable to accelerate to its full speed and would be obliged to remain at the one-third synchronous speed point. For this reason, the provision of slot 16, as set forth above, reduces the amount of the third harmonic dip and improves the performance of the motor by balancing the flux. Experience has further shown that the provision of reluctance slot 16 greatly decreases the noise which frequently prevailed during starting of this type of motor when connected to a load such as a fan, for instance. As explained before, the larger the section 12 encompassed by shading coil 14 the greater will be the starting torque at the expense of the running efficiency. The third harmonic dip in most previous motors was so great as to require that the shading coil be relatively large, on the order of 60 electrical degrees, to provide enough torque at the dip to keep the motor accelerating. The diminution of the third harmonic dip eliminates the necessity for the large shading coil span, and thereby permits considerable improvement in the efficiency. Thus, by providing section 15 and reluctance slot 16 in combination with shaded section 12, it has been possible to improve the starting torque characteristics of the motor while also improving the efficiency, and at the same time attaining a motor with less starting noise than was previously the rule.

It has been found, for instance, that shading coil section 12 may be decreased to approximately 20 electrical degrees without any substantial impairment of the sufficiency of the starting torque. While 20 electrical degrees represents approximately the minimum deemed desirable for the purposes of this invention, it may, of course, be possible to utilize the inventive features of this application in combination with even smaller shading coil sections, and it is not intended to limit the lower limit of the shading coil span to 20 electrical degrees. The lower limit should, instead, be determined by the minimum torque required for the purposes of each particular motor embodying the invention. The extent of pole face of section 15, as determined by the location of slot 16, is most important in that it has a considerable effect upon the performance of the motor. Thus, the advantages described above were each obtained to a marked degree when the span of section 16 was maintained within approximately 37 to 52 electrical degrees.

Referring again to Figure 1 of the drawing, a bridge 22 formed of magnetic material may be arranged between each two poles as shown. Such bridges generally have a relatively thin cross section so that they will saturate when the motor is in operation. They serve, in effect, to decrease the abruptness with which the flux pattern distributes from the pole into the rotor. The end of each pole acts as a wall behind which the flux pattern distributes itself from the stator to the rotor, with no flux whatsoever fringing into the rotor between poles. However, with bridges 22, even though they are saturated, a small amount of flux will pass from them into the rotor so as to decrease the abruptness of the change in the flux pattern. Bridges 22 have been shown in the Figure 1 since they may be used to considerable advantage with the remainder of the construction of this invention. However, it will be understood that the bridges may be omitted without departing in any way from the invention set forth in this application.

In actual tests, a six pole machine constructed in accordance with the invention gave excellent results.

Each pole of the motor was provided with a shading coil section of approximately 24 electrical degrees and a section 15 of approximately 45 electrical degrees. Section 15 was separated from the remainder of the pole by a slot 16 of .055 mils in width with bridges 17 and 18 of .025 mils in thickness each. This latter figure is determined primarily by the minimum structural strength permissible in the manufacturing process. For practical purposes, the minimum has been found to be determined by the thickness of the laminations of which the stator is formed, with the length of each bridge 17 and 18 normally being no less than the thickness of the material; however, it will of course be understood that such considerations are purely for manufacturing purposes and that, insofar as the invention is concerned, the important thing is to have a high reluctance barrier separating section 15 from the remainder of the pole.

In addition, the motor had the following additional specifications:

| | |
|---|---|
| Stator outer diameter_____inch__ | 5.48 |
| Stator bore diameter_____do____ | 3.125 |
| Rotor diameter_____do____ | 3.100 |
| Stack length_____do____ | 1.5 |
| No. of rotor bars_____ | 33 |
| No. of coil turns per stator pole (all poles connected in series)_____ | 70 |

With an applied voltage of 115 volts, following performance and characteristics were noted:

| | |
|---|---|
| Running efficiency_____ | 37.8 |
| Full load current_____ | 5.42 |
| Starting torque_____oz. ft__ | 6.33 |
| Dip torque (in percent of maximum torque)_____ | .532 |
| Starting noise (1 foot from 24 inch fan, using appropriate weighting net work)_____decibels__ | 50 |

These performance figures indicate that the overall performance of the motor was considerably improved over that of most shaded-pole induction motors of comparable size. At the same time, this advantage was obtained with a structure which presents very little complexity insofar as manufacturing is concerned due to the fact that the stator bore is entirely concentric without any variation in the radial air gap. In addition to the other previously discussed advantages, the full load current required by the motor was found to be considerably lower than in most previous designs of shaded pole motors. This is most important where, as is frequently the case, such a motor is to be used for air moving purposes in apparatus designed to be installed in the home, since home wiring is frequently taxed to the limits of its capacities by the number of power-consuming devices presently available for use in the home. This result is attributable to the small shading coil span made possible by the motor design of this invention.

While, for illustrative purposes, a six pole motor has been described, tests and calculations show that this invention will provide similar benefits in motors having two, four, or more poles, and is not to be restricted to any particular number of poles.

Thus, while this invention has been explained by describing a particular embodiment thereof, it will be apparent that improvements and modifications may be made without departing from the scope of the invention as defined in the appended claims.

What we claim as new and desire to secure by Letters Patent of the United States is:

1. In an induction motor of the shaded-pole type, a squirrel cage rotor, a stator surrounding said rotor and concentric therewith, said stator being symmetrical and being divided into a plurality of equispaced salient poles which form radial air gaps with said rotor, each of said poles having a shading coil spanning a section thereof, the unshaded portion of each of said poles having a section separated from the remainder of the unshaded portion by a single high reluctance barrier extending from the bore of the pole to the back of the pole.

2. In an induction motor of the shaded-pole type, a squirrel cage rotor, a stator surrounding said rotor and concentric therewith, said stator being symmetrical and being divided into a plurality of equispaced salient poles which form radial air gaps with said rotor, each of said poles having a shading coil spanning a section thereof, the unshaded portion of each of said poles having a section separated from the remainder of the unshaded portion by a single slot extending substantially across the unshaded pole tip from the bore surface thereof to the back thereof thereby to provide a high reluctance path for flux passing into said separated section.

3. In an induction motor of the shaded-pole type, a squirrel cage rotor, a stator surrounding said rotor and concentric therewith, said stator being symmetrical and being divided into a plurality of equispaced salient poles which form radial air gaps with said rotor, each of said poles having a shading coil spanning a section thereof, the unshaded portion of each of said poles having a section separated from the remainder of the unshaded portion by a single slot extending substantially across the unshaded pole tip from the bore surface thereof to the back thereof thereby to provide a high reluctance path for flux passing into said separated section, the end of said slot located adjacent the bore surface of said pole being positioned so to make said separated section have a span of 37 to 52 electrical degrees.

4. In an induction motor of the shaded-pole type, a squirrel cage rotor, a stator surrounding said rotor and concentric therewith, said stator being symmetrical and being divided into a plurality of equispaced salient poles which form radial air gaps with said rotor, each of said poles having a shading coil spanning a section thereof, the unshaded portion of each of said poles having a section separated from the remainder of the unshaded portion by a single slot extending substantially across the unshaded pole tip from the bore surface thereof to the back thereof thereby to provide a high reluctance path for flux passing into said separated section, the end of said slot adjacent the bore surface of said pole being positioned to make said separated section have a span of approximately 45 electrical degrees.

5. In an induction motor of the shaded-pole type, a squirrel cage rotor, a stator surrounding said rotor and concentric therewith, said stator being symmetrical and being divided into a plurality of equispaced salient poles which form radial air gaps with said rotor, each of said poles having a shading coil spanning a section thereof, the unshaded portion of each of said poles having a section separated from the remainder of the unshaded portion by a single slot extending substantially across the unshaded pole tip from the bore surface thereof to the back thereof thereby to provide a high reluctance path for flux passing into said separated section, said separated section being secured to the remainder of the pole by bridges at each end of said slot, said bridges being relatively thin so that they are saturable at a low voltage relative to the operating voltage of the motor.

6. In an induction motor of the shaded pole type, a squirrel cage rotor, a stator surrounding said rotor and concentric therewith, said stator being symmetrical and being divided into a plurality of equispaced salient poles which form radial air gaps with said rotor, each of said poles having a relatively wide base and a relatively narrow shank, each of said poles having a shading coil spanning a section thereof, the unshaded portion of each of said poles having a section separated from the remainder of the unshaded portion by a single slot extending substantially across the unshaded pole tip from the bore surface thereof to the back thereof adjacent said shank thereby to provide a high reluctance path for flux passing into said separated section, the end of said slot adjacent the bore surface of the pole being positioned to make said separated section have a span of 37 to 52 electrical degrees, and a plurality of wedge members of magnetic material, each of said wedge members being secured between the shaded section of one pole and the separated section of the adjacent pole and in magnetic contact therewith.

References Cited in the file of this patent

UNITED STATES PATENTS

| | | |
|---|---|---|
| 1,884,140 | Nickle | Oct. 25, 1932 |

FOREIGN PATENTS

| | | |
|---|---|---|
| 210,269 | Switzerland | Sept. 2, 1940 |
| 1,064,568 | France | Dec. 23, 1953 |